UNITED STATES PATENT OFFICE.

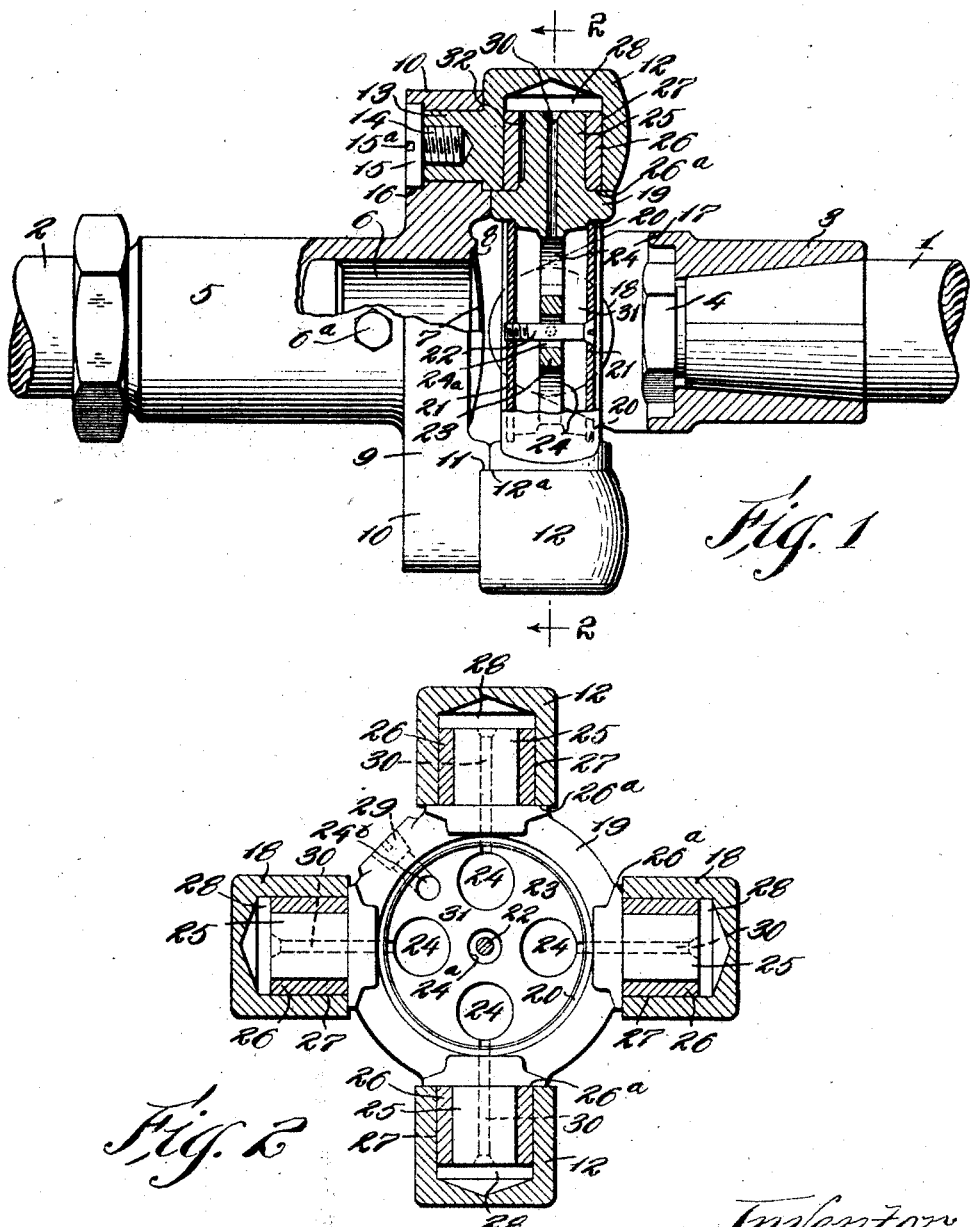

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,366,040.           Specification of Letters Patent.      Patented Jan. 18, 1921.

Application filed May 8, 1919. Serial No. 295,724.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints and has for its general object to produce a joint of this character wherein novel and effective means are provided for lubricating, by centrifugal action, the journals or bearings for the trunnions. I realize this object in and through the construction shown in the drawings forming part hereof, wherein Figure 1 represents a side elevation of such joint, together with its coöperating parts, certain of the parts being shown in section; and Fig. 2 a central longitudinal sectional view through such joint and parts, certain of the parts being shown in elevation.

Describing by reference characters the various parts illustrated herein, 1 and 2 denote the end portions of shaft sections connected by my joint. The shaft section 1 is provided with a hub 3 which may be splined thereto, the hub being shown as provided with a tapered bore for the reception of the correspondingly tapered portion of the shaft end. At its extreme end, the shaft section is reduced and threaded for the reception of a nut 4 by means of which and the spline it is connected to the hub. The shaft section 2 is also splined to an elongated hub 5 which is shown as extending beyond the end of the shaft and providing therefor a lubricant well 6 having a filling opening closed by a removable plug 6ª and closed at its outer end by means of a concavo-convex plate 7 forced to a seat 8, said plate being preferably what is known to the trade as a "Welch plug." Extending transversely of the inner end of the hub is a supporting base or flange 9 having at each end thereof a flanged projection 10 which is faced off and machined to provide an accurate seat for the base of a bearing block, being provided with a shoulder 11 which is adapted to bear against and aline the adjacent side 12ª of the bearing block 12 with reference to a trunnion of the connecting member. Each block is provided with a stud 13 projecting from the base thereof into and nearly through a bore in the outer end of the base flange 9, the stud making a snug fit with said bore and being internally threaded to receive a stud bolt 14. Each stud bolt 14 is provided with a cylindrical head 15 adapted, when the bolt is screwed home, to fit within an annular recess 16 formed within the bottom of each flanged projection of the base and constituting an enlargement of the bore thereof. The annular recesses 16 are preferably each of the same depth as the heads 15, whereby the bottoms of said heads will be substantially flush with the bottoms of their respective flanged projections. Each bolt head may be slotted, as shown at 15ª, for the reception of a screw driver and, when the bolts are set up, they may be retained in place by merely staking or peening the metal at the base of the flanged projections into one or both ends of each slot.

The hub 3 is provided with a base 17 similar to the base 9 and having seats for blocks 18 similar in construction and arrangement to the corresponding parts carried by the hub 5.

The rotatable connecting member comprises a ring 19 shown as having an annular seat 20 at each side thereof for the reception of a cover plate 21. These cover plates may be of the "Welch plug" type, sprung to their seats by bending the central portions thereof toward each other. When deemed necessary, a bolt 22 may be employed to connect the central portions of said plates.

The rim 19 will be made as a forging or casting and is provided with a web 23 extending transversely thereof and preferably midway between the seats 20. This web is provided with a plurality of openings 24, four such openings being shown. The ring is provided with trunnions 25 each of which is mounted within a bushing 26 supported at one end against a shoulder 27 which is adapted to engage the inner face of the corresponding bearing block. The bushings and trunnions are inserted within the bores of the bearing blocks within the bores 27, each bore extending outwardly from the inner face of its block but terminating within the outer face thereof and providing beyond each trunnion and bushing a well 28 for lubricant. The interior of the ring 19 and the cover plates 21 provide a central chamber for lubricant, which chamber may be filled from time to time by means of a filling opening having a removable plug 29. Each trunnion is provided with an axial port 30 extending from the outer end thereof through the ring 19 and communicating at its inner end with the interior of an opening 24, the said openings being preferably arranged so that a diameter thereof is in a plane including the axial port of the adjacent trunnion and the center of the well 31 formed within the ring.

In operation, lubricant from the well 31 will be supplied by centrifugal action through the ports 30 to the wells 28 and thence, through ports 32 formed in the outer walls of the trunnions, to the interior of each bushing. The openings 24 and the central opening 24$^a$ in the web 23 insure a proper distribution of the lubricant within the central well and from said well to the bearings.

By the use of the web 23, the ring 19 may be made lighter than is the case with prior constructions and without sacrificing the ultimate strength thereof and without interfering with the distribution of lubricant from the well 31. As long as any material amount of lubricant remains within the well, it will be supplied by centrifugal action through the ports 30 to the bearings.

The filling opening for the well 31 preferably extends through the ring 19 to an opening 24$^b$ in the web.

Having thus described my invention, what I claim is:—

1. In a universal joint, the combination of a connecting member having trunnions, a central well for lubricant and a transverse web extending across said well intermediate the sides thereof and having openings therethrough, bearings for said trunnions, and ports in said trunnions for conducting lubricant from said well to said bearings.

2. In a universal joint, the combination of a ring having trunnions, a central well for lubricant and a transverse web extending across said well, midway between the sides thereof and having openings therethrough, bearings for said trunnions, and an axial port in each trunnion communicating at its inner end with one of said openings and serving to conduct lubricant from said well to the bearing of said trunnions.

3. In a universal joint, the combination of a ring having trunnions, a central well for lubricant and a transverse web extending across said well midway between the sides thereof and having a central opening and marginal openings therethrough, bearings for said trunnions, an axial port in each trunnion communicating at its inner end with one of said marginal ports and at its outer end with the bearing for said trunnion, and a filling opening for said well extending from the outer surface of said ring to one of said marginal openings.

4. In a universal joint, the combination of a ring having trunnions, a central well for lubricant and a transverse web extending across said well and having a central opening and marginal openings therethrough, bearings for said trunnions, a port in each trunnion communicating at its inner end with one of said marginal ports and at its outer end with the bearing for said trunnion, and a filling opening for said well extending from the outer surface of said ring to one of said marginal openings.

5. In a universal joint, the combination of a ring having trunnions and plates forming with the interior of said ring a central well for lubricant, and a transverse web extending across said well midway between the said plates and having a central opening and marginal openings therethrough, bearings for said trunnions, an axial port in each trunnion communicating at its inner end with one of said marginal ports and at its outer end with the bearing for such trunnion, a filling opening for said well extending from the outer surface of said ring to one of said marginal openings, and a fastening device for said plates extending through the central opening in said well.

6. In a universal joint, the combination of a connecting member having trunnions, a central well for lubricant and a transverse web extending across said well and having marginal openings therethrough, bearings for said trunnions, a port in each trunnion communicating at its inner end with one of said marginal ports and at its outer end with the bearing for said trunnion, and a filling opening for said well extending from the outer surface of said member.

In testimony whereof I hereunto affix my signature.

WILLIAM H. THIEMER.